United States Patent
Lee

(10) Patent No.: US 10,628,644 B2
(45) Date of Patent: Apr. 21, 2020

(54) SYSTEM AND METHOD FOR SEQUENCE MANAGEMENT OF VEHICLES

(71) Applicants: HYUNDAI MOTOR COMPANY, Seoul (KR); KIA MOTORS CORPORATION, Seoul (KR)

(72) Inventor: Sung Wook Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/178,254

(22) Filed: Nov. 1, 2018

(65) Prior Publication Data

US 2019/0130145 A1 May 2, 2019

(30) Foreign Application Priority Data

Nov. 1, 2017 (KR) .................. 10-2017-0144600

(51) Int. Cl.
| | |
|---|---|
| G06F 17/00 | (2019.01) |
| G06K 7/10 | (2006.01) |
| G06K 19/07 | (2006.01) |
| G06Q 50/04 | (2012.01) |
| G06Q 10/08 | (2012.01) |
| G06Q 50/28 | (2012.01) |

(52) U.S. Cl.
CPC ..... G06K 7/10366 (2013.01); G06K 7/10316 (2013.01); G06K 19/0702 (2013.01); G06Q 10/08 (2013.01); G06Q 10/087 (2013.01); G06Q 50/04 (2013.01); G06Q 50/28 (2013.01)

(58) Field of Classification Search
CPC .......... G06K 7/10366; G06K 7/10316; G06K 19/0702
USPC .................................. 235/375, 384
See application file for complete search history.

(56) References Cited

U.S. PATENT DOCUMENTS 7,346,374 B2 * 3/2008 Witkowski ............ G07C 5/008
455/569.2
9,333,654 B2 * 5/2016 Chen ...................... B25J 9/1697

* cited by examiner

Primary Examiner — Karl D Frech
(74) Attorney, Agent, or Firm — Morgan, Lewis & Bockius LLP

(57) ABSTRACT

A system for sequence management of vehicles may include: smart tags respectively attached to each of vehicles which are sequentially moved in a production line; a tag recognition device disposed in the production line and receiving data from the smart tags and sensing whether the smart tags enter respective process areas and an actual vehicle sequence through the data; and a server storing sequence information of the vehicles, receiving the actual vehicle sequence from the tag recognition device, comparing the sequence information and the actual vehicle sequence, and determining whether a sequence error occurs in the sequence information, and when the error occurs in the sequence information, changing the sequence information to the actual vehicle sequence.

18 Claims, 8 Drawing Sheets

SYSTEM AND METHOD FOR SEQUENCE MANAGEMENT OF VEHICLES

CROSS-REFERENCE TO RELATED APPLICATION

This application claims priority to and the benefit of Korean Patent Application No. 10-2017-0144600 filed in the Korean Intellectual Property Office on Nov. 1, 2017, the entire contents of which are incorporated herein by reference.

TECHNICAL FIELD

The present disclosure relates to a system and a method for sequence management of vehicles, and more particularly, to a system and a method for sequence management of vehicles, which manage a variation of a sequence of a vehicle produced in a factory.

BACKGROUND

In general, in a production line of a vehicle factory, sequence information of vehicles to be sequentially transported to a conveyor is managed and an assembly process is managed in consideration of specification information of the vehicles matched with the sequence information.

A manufacturing execution system (MES) manages the sequence information of vehicles sequentially mounted on a movement means installed in a conveyor and the vehicles are moved and assembled along the production line for each process.

In the related art, the MES transmits the sequence information of the vehicles to a facility terminal and the facility terminal performs a corresponding process operation considering the specification information according to the sequence information. In this case, since various types of vehicles may be assembled in one production line, parts to be applied to the vehicles may be changed according to the respective specification information, or assembly of some parts may be added or omitted, accordingly.

Meanwhile, in a normal state in which the sequence information and a vehicle movement order of the production line match each other, the assembly of the vehicle part depending on the specification information is normally performed.

On the contrary, when a blank pitch is generated due to various reasons during the assembly process of the vehicle, the sequence information transmitted in the MES and the vehicle movement order on the production line do not match each other, and as a result, a sequence error occurs. Here, the blank pitch refers to removal of the vehicle from the production line for various reasons such as a defective vehicle, a manual operation of a vehicle body, a process failure, etc. during an assembling process of the vehicle.

In the related art, an operator manually changes the sequence information when it is required to change the sequence information by changing the movement order of the vehicles according to the occurrence of the blank pitch.

However, as the operator manually changes the sequence information, the sequence information change may be missed or erroneously changed, which may cause inconsistency of the sequence of actual vehicles entering a process line and the vehicles on the sequence information. Therefore, the parts may be erroneously mounted or not mounted on the vehicles, and as a result, the vehicles may be defective. Further, there is a problem that the movement order and the sequence information of the actual vehicles may be inconsistent with each other and confusion may occur in process work, or the production line may be stopped, and as a result, efficiency of the production line is lowered.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a system and a method for sequence management of vehicles, which automatically change sequence information according to occurrence of a blank pitch by monitoring information of a smart tag attached to a vehicle input in a production line in real time.

An exemplary embodiment of the present disclosure provides a system for sequence management of vehicles. The system may include: smart tags respectively attached to vehicles which are sequentially moved in a production line; a tag recognition device disposed in the production line and receiving data from the smart tag and sensing whether the smart tags enter respective process areas and an actual vehicle sequence through the data; and a server storing sequence information of the vehicles, receiving the actual vehicle sequence from the tag recognition device, comparing the sequence information and the actual vehicle sequence, and determining whether a sequence error occurs in the sequence information and when the error occurs in the sequence information, changing the sequence information to the actual vehicle sequence.

The sequence information may include vehicle information (VIN) of each vehicle to which a respective one of the smart tags is attached, specification information, and a tag ID.

The data transmitted by the smart tag may include a tag ID (VIN), movement information, and positional information and the tag ID (VIN) of the smart tag may be configured by the vehicle information of the vehicle.

Each smart tag may include a radio frequency identification (RFID) transmitting the data to the tag recognition device, a memory storing the tag ID (VIN), a battery supplying power for operating the smart tag, an acceleration sensor measuring an acceleration and a moving speed of the smart tag, a gyro sensor measuring an angular velocity of the smart tag and a moving direction of the smart tag depending on the angular velocity, and a control module transmitting the movement information to the tag recognition device, and the movement information may include at least one of the moving speed, the acceleration, a moving time, and the moving direction of the smart tag.

The tag recognition device may further include a reader antenna receiving the data from the smart tags.

The tag recognition device may calculate movement distances of the smart tags based on a starting point of the production line and derive position coordinates of the smart tags by comparing the movement distances with map information of the production line.

The server may further receive position coordinates and a sensing signal from the tag recognition device, and the server may include a database DB storing the sequence information, a communication device receiving the tag IDs (VIN), the position coordinates, and the sensing signals of the smart tags from the tag recognition device, a sequence management device receiving the sequence information from a manufacturing execution system (MES), a position tracking device tracking the position coordinates of the smart tags, and a controller checking whether the smart tags are within the respective process areas by comparing the position coordinate of the smart tag with a map of the production line when the communication device receives the sensing signals.

The controller may cause a screen to display vehicle information (VIN) which is inconsistent with the actual vehicle sequence in the sequence information and to display sequence error information when the sequence error occurs in the sequence information.

The controller may cause a screen to display as a blank an order of a conveyor moving section in which a blank pitch is generated in the sequence information.

When a vehicle re-enters a movement section which is in a blank state, the controller may change the sequence information to the tag ID (VIN) of the smart tag attached to the vehicle which re-enters in the blank.

Another exemplary embodiment of the present disclosure provides a method for managing a sequence of vehicles by using a server installed in a production line, smart tag respectively attached to the vehicles, and a tag recognition device. The method may include: storing, by the server, sequence information (VIN) of the vehicles sequentially arranged in the production line; receiving, by the tag recognition device, data from the smart tags, calculating position coordinates of the smart tags through the data, and sensing an actual vehicle sequence and transmitting the sensed vehicle sequence to the server; receiving, by the server, the position coordinates and the actual vehicle sequence from the tag recognition device and determining whether the smart tags enter respective process areas through the position coordinates; determining, by the server, whether a sequence error occurs in the sequence information when it is determined that the smart tags enter respective the process areas, and changing, by the server, the sequence information to the actual vehicle sequence when it is determined that the sequence error occurs.

The method may further include, before the receiving of the sequence information by the server, correcting, by the smart tags, tag IDs to vehicle information (VIN) of the vehicles to which the smart tags are attached, respectively.

The determining of whether the smart tags enter the respective process areas by the server may be made based on whether the position coordinates of the smart tags received from the tag recognition device are within the respective process areas of a map of the production line.

In the calculating of the position coordinate by the tag recognition device, movement distances of the smart tags may be calculated based on a starting point of the production line, and the movement distances of the smart tags may be compared with map information of the production line and derived based on the comparison.

The determining of whether the sequence error occurs by the server may include extracting vehicle information (VIN) which is inconsistent with the actual vehicle sequence in the stored sequence information when the sequence error occurs, and displaying, on a screen, the inconsistent vehicle information (VIN) and the sequence error.

The changing of the sequence information by the server may include changing an order of a movement section in which a blank pitch is generated in the sequence information to a blank, and changing, when the vehicle is rearranged to the movement section changed to the blank, the blank to a tag ID (VIN) of the smart tag attached to the rearranged vehicle.

The server may further include a position tracking device and the determining of whether the smart tags enter the respective process areas by the server includes measuring, by the position tracking device, the position coordinates of the smart tags and determining that a drop event occurs in one of the smart tags when the one of the smart tags is less than a predetermined reference height, and the position tracking device may measure the position coordinates of the smart tags based on a real-time locating system (RTLS).

The determining of whether the smart tags enter the respective process areas by the server may include determining that a drop event of one of the smart tags occurs when the one of the smart tags is dropped at a gravitational acceleration.

The determining of whether the smart tags enter the respective process areas by the server may include determining, by the server, that a separation event occurs when a distance between a front vehicle and a rear vehicle exceeds a set reference distance.

The determining of whether the smart tags enter the respective process areas by the server may include determining that a failure or loss event of one of the smart tags occurs when a receiving time interval of the position coordinate of the one of the smart tags, which is received from the tag recognition device exceeds a set reference time.

Tag recognition deviceCommunication devicePosition tracking deviceController

DETAILED DESCRIPTION OF THE EMBODIMENTS

Figure 1:
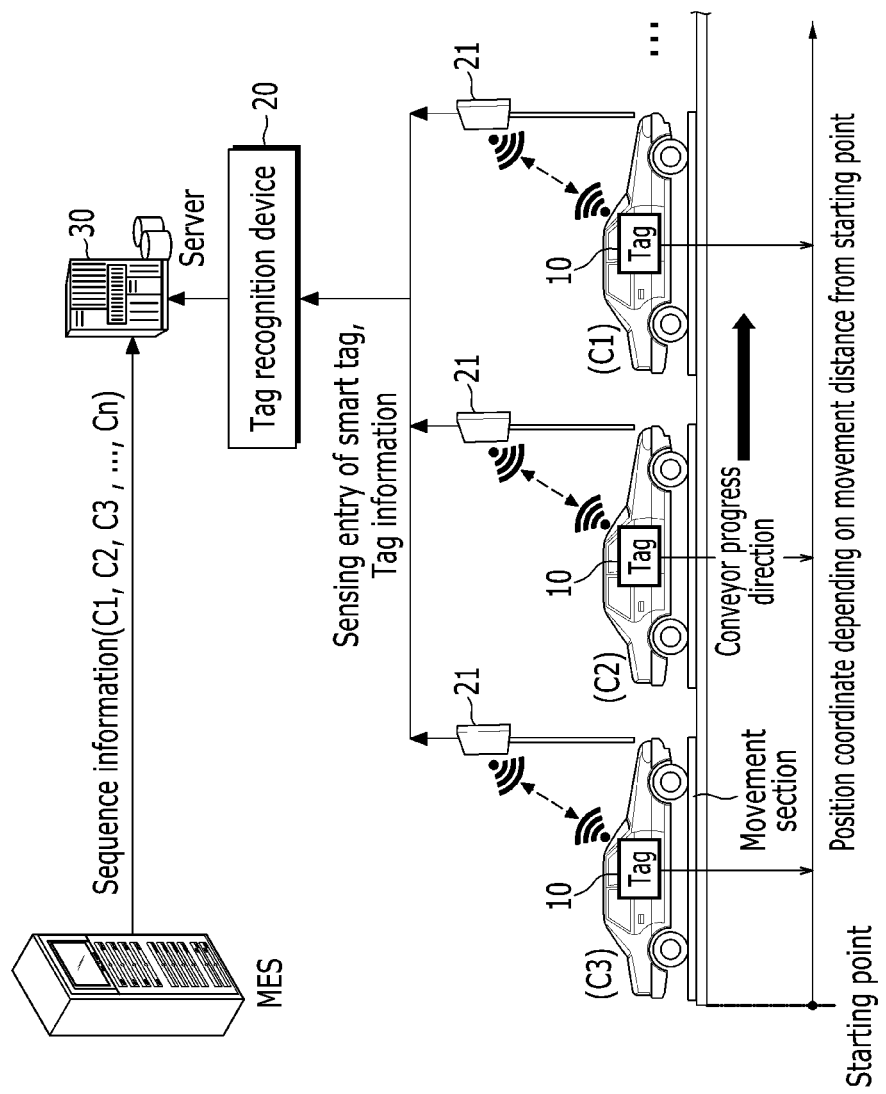
FIG. 1 schematically illustrates a configuration of a system for sequence management of vehicles according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or," "module," and/or "unit" described in the specification mean components for processing at least one function and operation and can be implemented by hardware components including, but not limited to, a sensor, an antenna, a microprocessor, processor, circuits, or a computing device such as a commuter, or software components, and combinations thereof.

A vehicle used throughout the specification includes not only a finished vehicle but also a body in white being assembled in a production line, and a fact that the vehicle is moved means that the vehicle is moved by a moving means such as a conveyor, not by itself.

Hereinafter, a system and a method for sequence management of vehicles according to exemplary embodiments of the present disclosure will be described in detail with reference to drawings.

Figure 2:
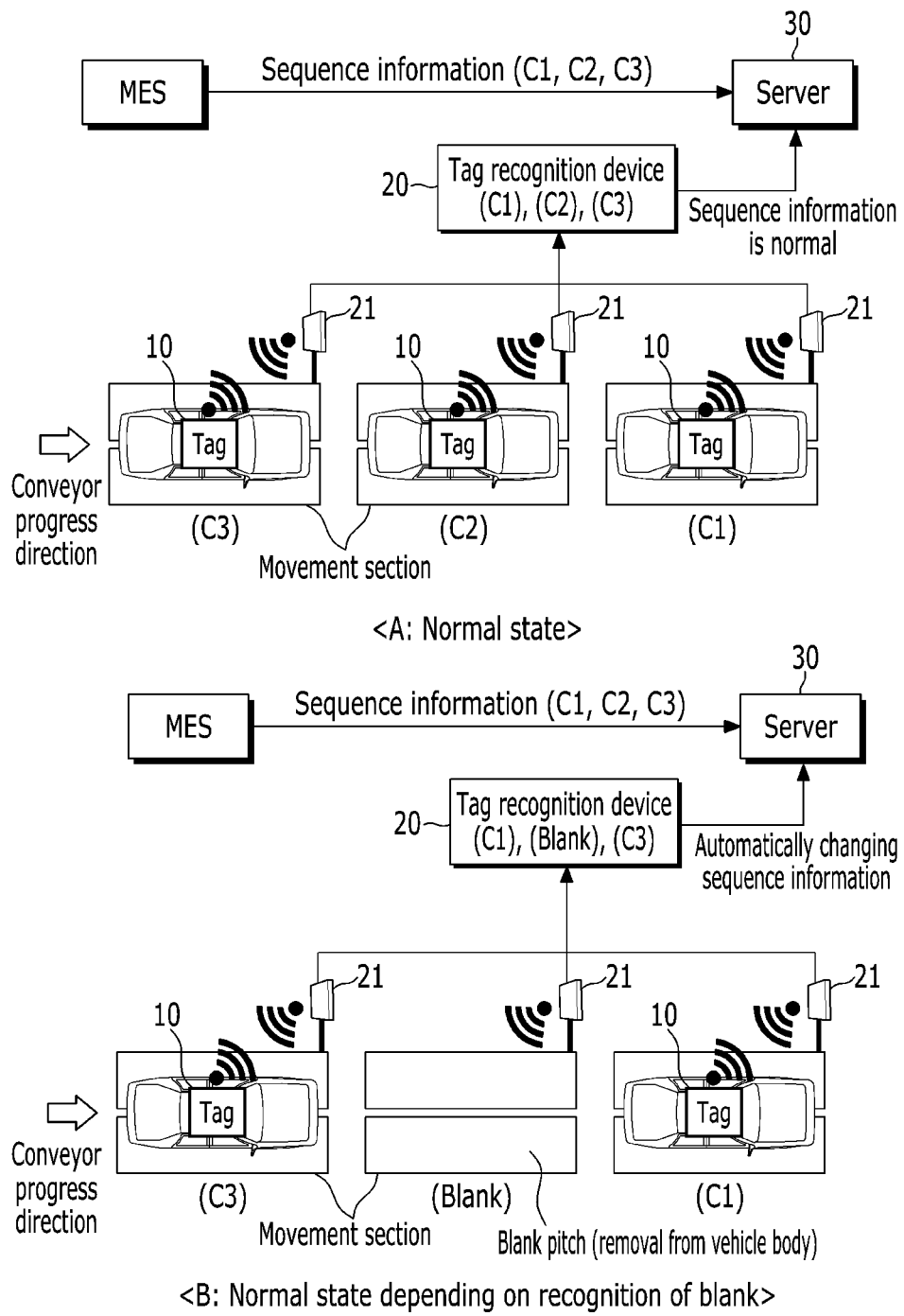
FIG. 2 is a conceptual view illustrating a method for managing sequence information of vehicles according to an exemplary embodiment of the present disclosure.

FIG. 1 schematically illustrates a configuration of a system for sequence management of vehicles according to an exemplary embodiment of the present disclosure and FIG. 2 is a conceptual view illustrating a method for managing sequence information of vehicles according to an exemplary embodiment of the present disclosure.

Referring to FIGS. 1 and 2, a system for sequence management of a vehicles according to an exemplary embodiment of the present disclosure includes a smart tag 10, a tag recognition device 20, and a server 30.

The smart tags 10 are attached to vehicle bodies of a first vehicle C1, a second vehicle C2, and a third vehicle C3, respectively, which are moved in a production line on which the vehicle is assembled.

The smart tag 10 stores a vehicle identification number (VIN) of a vehicle to which the smart tag 10 is attached as a tag ID and has a transmitter such as an antenna to transmit data required for managing sequence information of the vehicle to the tag recognition device (VIN) 20 through the tag ID (VIN).

The data includes movement information and positional information in the production line, and the tag ID (VIN).

The positional information refers to information required for determining whether the tag recognition device 20 enters a process area in the production line designated by the smart tag 10.

The movement information may include at least one of a moving speed, an acceleration, a moving time, and a moving direction of the vehicle, to which the smart tag 10 is attached, in the production line.

A method for calculating the position coordinate of the smart tag 10 by the tag recognition device 20 will be described later.

The tag ID (VIN) of the smart tag 10 is used to identify each vehicle and may be used as identification information of the smart tag 10 and the vehicle to which the smart tag 10 is attached.

In the following description, the tag ID is referred to as "tag ID (VIN)" as a tag ID configured by VIN information.

Further, the smart tag 10 may autonomously diagnose an attachment state thereof and transmit the diagnosed attachment state to the server 30.

That is, the smart tag 10 may autonomously diagnose the attachment state of the smart tag 10 using the movement information and autonomously diagnose the attachment state such as whether the smart tag 10 is separated from the vehicle or dropped and transmit the diagnosed attachment state to the server 30.

A detailed configuration of the smart tag 10 will be described later with reference to FIG. 3.

The tag recognition device 20 includes a plurality of reader antennas 21 disposed in the production line.

The tag recognition device 20 receives data from the smart tag 10 via the reader antenna 21.

Then, the tag recognition device 20 forms a sensing signal notifying a fact of data reception, and transmits the sensing signal to the server 30.

In this case, the tag recognition device 20 transmits the movement information recognized from the data and the tag ID (VIN) to the server 30.

Further, the tag recognition device 20 may sense whether the vehicle to which the smart tag 10 is attached enters the process area by using the positional information included in the data.

When the smart tag 10 enters the process area, the tag recognition device 20 may form an entry signal for notifying that the smart tag 10 enters the process area and transmit the entry signal to the server 30.

Furthermore, the tag recognition device 20 recognizes the smart tag 10 attached to each vehicle according to the movement order of the vehicle moving in the production line and senses an actual vehicle sequence in which the vehicles sequentially enter the process area and transmits the sensed actual vehicle sequence to the server 30.

Thereafter, the tag recognition device 20 may calculate the position coordinate from the movement information recognized from the data received from the smart tag 10 and the tag ID (VIN) of the smart tag 10 and transmit the calculated position coordinate to the server 30.

A process of calculating the position coordinate of the smart tag 10 by the tag recognition device 20 will be described later with reference to FIG. 6.

Here, in the production line in the related art, since an operator reads that the vehicle enters the process area through a barcode scanner to confirm vehicle information and specification information, there is a disadvantage in that recognition of a barcode is missed due to occurrence of a work flow and a human error.

However, according to an exemplary embodiment of the present disclosure, there is an advantage in that the tag recognition device 20 receives the data from the smart tag 10 and senses entry of the smart tag 10 into the process area and measures the position coordinate of the smart tag 10 based on the received data in an automatic manner, to remedy the disadvantage.

The server 30 interlocks with a manufacturing execution system (MES) in a factory and manages process work according to the sequence information and the specification information of the vehicle which enters along the production line.

The server 30 receives the sequence information of vehicles sequentially arranged in a movement means of the production line from the MES and stores the received sequence information in a database DB.

The sequence information may include vehicle information (VIN) of the vehicle to which the smart tag 10 is attached, the specification information, and the tag ID of the smart tag 10.

Here, the tag ID (VIN) and the vehicle information (VIN) for one vehicle are used for distinguishing the information stored in the smart tag 10 and the server 30, respectively, and mean a vehicle identification number (VIN) of the same vehicle.

Further, the specification information means information for distinguishing options applied to the process work for each vehicle by considering a type (model) of the vehicle, an option for each vehicle type, a domestic use, an export use, a sales area, and the like.

The server 30 receives the entry signal from the tag recognition device 20 and senses that the smart tag 10 enters the process area.

Further, the server 30 receives the sensing signal from the tag recognition device 20 and recognizes that the tag recognition device 20 receives the data from the smart tag 10.

Then, the server 30 checks the position coordinate of the smart tag 10 on map information of the production line to confirm (verify) whether to enter the corresponding process area.

The server 30 may confirm whether the smart tag 10 enters the process area separately from or together with the process area entry sensing of the smart tag 10 by the tag recognition device 20.

Further, the tag recognition device 20 may calculate the position coordinate and transmit the calculated position coordinate to the server 30 or a position tracking device 33 (see FIG. 4) of the server 30 may calculate the position coordinate. When the server 30 verifies that the smart tag 10 enters the process area, the server 30 receives the tag ID (VIN), the movement information, and the actual vehicle sequence from the tag recognition device 20.

The server 30 queries the vehicle information VIN stored in the DB based on the tag ID (VIN) and checks whether the actual vehicle sequence matches the sequence information stored in the DB.

When the actual vehicle sequence and the sequence information stored in the DB are inconsistent and a sequence error thus occurs, the server 30 automatically correct the inconsistent sequence information to match the actual vehicle sequence.

Further, the server 30 may track the position of the smart tag 10 or monitor the attachment state using the movement information and the position coordinate of the smart tag 10.

The position tracking and the attachment state monitoring will be described below with reference to FIGS. 7 and 8.

Hereinafter, in FIG. 2, a method for managing the sequence information by the server 30 will be described.

FIG. 2 illustrates a normal state in which the actual vehicle sequence and the sequence information are consistent (labeled <A: Normal State> and a corrected state after detecting that the actual vehicle sequence and the sequence information are inconsistent and the sequence error occurs (labeled <B: Normal State depending on recognition of blank>).

That is, as illustrated in <A: Normal State> in FIG. 2, the server 30 may sequentially compare the actual vehicle sequences ((C1), (C2), (C3)) detected by the tag recognition device 20 and the sequence information (C1, C2, C3) stored in the DB and when the actual vehicle sequence and the sequence information are consistent, the server 30 may determine a current state as the normal state in which the actual vehicle sequence and the sequence information match each other.

Further, as illustrated in <B: Normal State depending on recognition of blank> in FIG. 2, when a blank pitch occurs on the production line, the server 30 may determine that the sequence error occurs in which the actual vehicle sequence ((C1), (Blank), (C3)) detected by the tag recognition device 20 and the sequence information (C1, C2, C3) stored in the DB are inconsistent.

In this case, the server 30 automatically changes the sequence information according to the actual vehicle sequence by recognizing a blank of the movement means due to the blank pitch to maintain the process work in the normal state.

Further, the server 30 may continuously check an order of the vehicle by receiving the actual vehicle sequence from the tag recognition device 20 even if the sequence error occurs due to the occurrence of the blank pitch in a preceding process. Furthermore, even if the vehicle is deviated (removed) from a route of a conveyor due to a process failure, the server 30 tracks the position of the smart tag 10 to determine the current position and monitor a processing status and re-entry in the production line.

Figure 3:
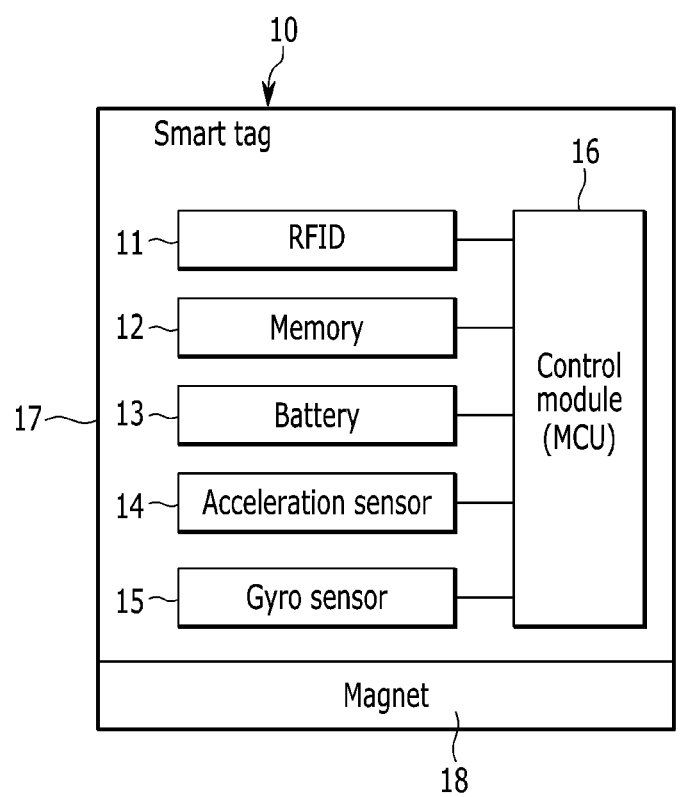
FIG. 3 is a block diagram schematically illustrating a configuration of a smart tag according to an exemplary embodiment of the present disclosure.

FIG. 3 is a block diagram schematically illustrating a configuration of a smart tag according to an exemplary embodiment of the present disclosure.

Referring to FIG. 3, the smart tag 10 according to an exemplary embodiment of the present disclosure includes an RFID 11, a memory 12, a battery 13, an acceleration sensor 14, a gyro sensor 15, and a control module 16.

The smart tag 10 may be attached to a vehicle body by a magnet 18 formed on one surface of a housing 17.

A radio frequency identification (RFID) 11 is configured by an active element powered by the battery 13 and serves as a communication module for transmitting data to the tag recognition device 20.

The data includes the positional information, the movement information, and the tag ID (VIN).

Further, the RFID 10 may transmit the attachment state of the smart tag 10 to the server 30.

The memory 12 stores the vehicle identification number (VIN) of the vehicle to which the smart tag 10 is attached as the tag ID. The tag ID (VIN) may store the vehicle identification number of the vehicle body read through the barcode scanner.

The battery 13 supplies power for operating the smart tag 10.

The accelerator sensor 14 measures the moving speed and the acceleration according to movement of the smart tag 10.

The gyro sensor 15 measures an angular velocity of the smart tag 10 and measures a moving direction of the smart tag 10 from the angular velocity. Further, the gyro sensor 15 may determine a change of a vehicle attachment state of the smart tag 10 or the like through a change in angular velocity. Furthermore, the acceleration and the angular velocity may be later used to measure the position coordinate of the smart tag 10 on a conveyor route according to the movement of the vehicle and measure a gravitational acceleration for determining a drop event.

The control module 16 may be implemented as one or more processors operating according to a set program and the set program may include a series of commands for controlling the smart tag 10 and may be configured as a micro controller unit (MCU) such as a microprocessor and processor.

The control module 16 receives, processes, and integrates the movement information measured by the sensors 14 and 15 and transmits the integrated movement information to the tag recognition device 20.

The movement information includes the moving speed, the acceleration, the moving time, the angular velocity, and the moving direction measured by the acceleration sensor 14 and the gyro sensor 15. Further, the control module 16 may determine the attachment state of the smart tag 10 and transmit the determined attachment state to the server 30 by performing a self-check logic of the smart tag 10 based on the movement information.

That is, the control module 16 may detect whether the smart tag 10 is normally attached to the vehicle or whether the smart tag 10 is separated from the vehicle and transmit the attachment or separation state to the server 30.

For example, the control module 16 may determine that the drop event occurs when the angular velocity of the smart tag 10 is changed and a vertical downward acceleration exceeds a reference acceleration.

The reference acceleration may be an acceleration slightly less than a gravitational acceleration and may be, for example, 0.9 g.

The control module 16 may determine that an attachment position of the smart tag 10 is changed when the angular velocity of the smart tag 10 is changed but the reference acceleration in a vertical downward direction is smaller than the gravitational acceleration.

The control module 16 transmits the movement information and the attachment state of the smart tag 10 to the tag recognition device 20 or the server 30 via the RFID 11.

Figure 4:
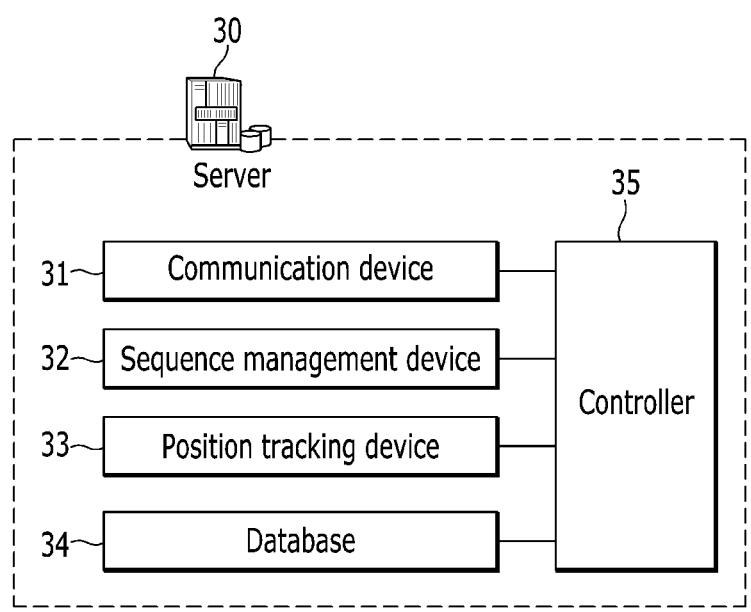
FIG. 4 is a block diagram schematically illustrating a configuration of a server according to an exemplary embodiment of the present disclosure.

FIG. 4 is a block diagram illustrating a configuration of a server according to an exemplary embodiment of the present disclosure.

Referring to FIG. 4 which is accompanied, the server 30 according to an exemplary embodiment of the present disclosure includes a communication device 31, a sequence management device 32, a position tracking device 33, a database 34, and a controller 35.

The communication device 31, including an antenna or a bus interface, receives the position coordinate, the sensing signal, the movement information, the tag ID (VIN), and the actual vehicle sequence of the smart tag 10 from the tag recognition device 20. Further, the communication device 31 may receive the entry signal from the tag recognition device 20. In addition, the communication device 31 may receive the attachment state of the smart tag 10 from the smart tag 10.

The sequence management device 32 receives the sequence information of the vehicle from the MES and updates the sequence information stored in the server 30 based on the sequence information.

The position tracking device 33 stores an arrangement coordinate of the reader antenna 21 and determines the position of the smart tag 10 based on the stored arrangement coordinate. The position tracking device 33 as a dualized real-time locating system (RTLS) determines the position of the smart tag 10 separately from the position coordinate received by the tag recognition device 20. The position tracking device 33 determines which reader antenna 21 receives the data from the smart tag 10 using the sensing signal.

Thereafter, the position tracking device 33 may determine the coordinate of the reader antenna 21 based on the stored arrangement coordinate and the movement information received from the tag recognition device 20 and determine the position coordinate (x, y, z) of the smart tag 10 through the determined coordinate. In this case, the position tracking device 33 may determine the position coordinate of the smart tag 10 using a triangulation method. Since the triangulation method is apparent to those skilled in the art, a description of the triangulation method is omitted in the present specification.

The database 34, including a non-transitory memory, a transitory memory, or a combination hereof, stores various programs and data for sequence management of the vehicle according to an exemplary embodiment of the present disclosure and stores data generated according to the operation. The data may include all data for the sequence management of the vehicle, such as the tag ID (VIN), the sequence information, the actual vehicle sequence, the sensing signal, the entry signal, the movement information, and the attachment state of the smart tag 10.

The controller 35 is a central processing unit (CPU) for controlling an overall operation for the sequence management of the vehicle in the production line.

When the communication device 31 receives the sensing signal from the tag recognition device 20, the controller 35 confirms the entry of the smart tag 10 in the process area through the position coordinate of the smart tag 10 received from the tag recognition device 20.

The controller 35 may confirm whether the smart tag 10 enters the process area separately from or simultaneously with confirming of the entry of the smart tag 10 in the process area by the tag recognition device 20.

When it is confirmed that the smart tag 10 enters the process area, the controller 35 verifies whether the actual vehicle sequence of the smart tag 10 which enters the process area and the sequence information stored in the DB are consistent.

That is, the controller 35 determines that the sequence error does not occur when the actual vehicle sequence and the sequence information are consistent, and determines that the sequence error occurs when the actual vehicle sequence and the sequence information are inconsistent. When the sequence error occurs in the sequence information, the controller 35 displays the sequence error on a screen and automatically changes the sequence information to match the actual vehicle sequence.

The controller 35 may send a signal to a display (not shown) connected to the controller 35 to cause the display to display a message or send a signal to an audio output device such as a speaker connected to the controller 35 to cause the audio output device to ask whether to automatically modify the vehicle information (VIN) on the sequence information to a user while changing the sequence information.

The controller 35 may be implemented as one or more processors which operate by the set program and the set program may include a series of commands for controlling the server 30. Further, the controller 35 may determine the attachment state of the smart tag 10 based on the movement information and the position coordinate received from the tag recognition device 20.

Hereinafter, a method for sequence management of the vehicle, in which the controller 35 of the present disclosure detects a sequence information error of the vehicle, which occurs in the production line and automatically corrects the detected sequence information error will be described in detail through FIG. 5.

Figure 5:
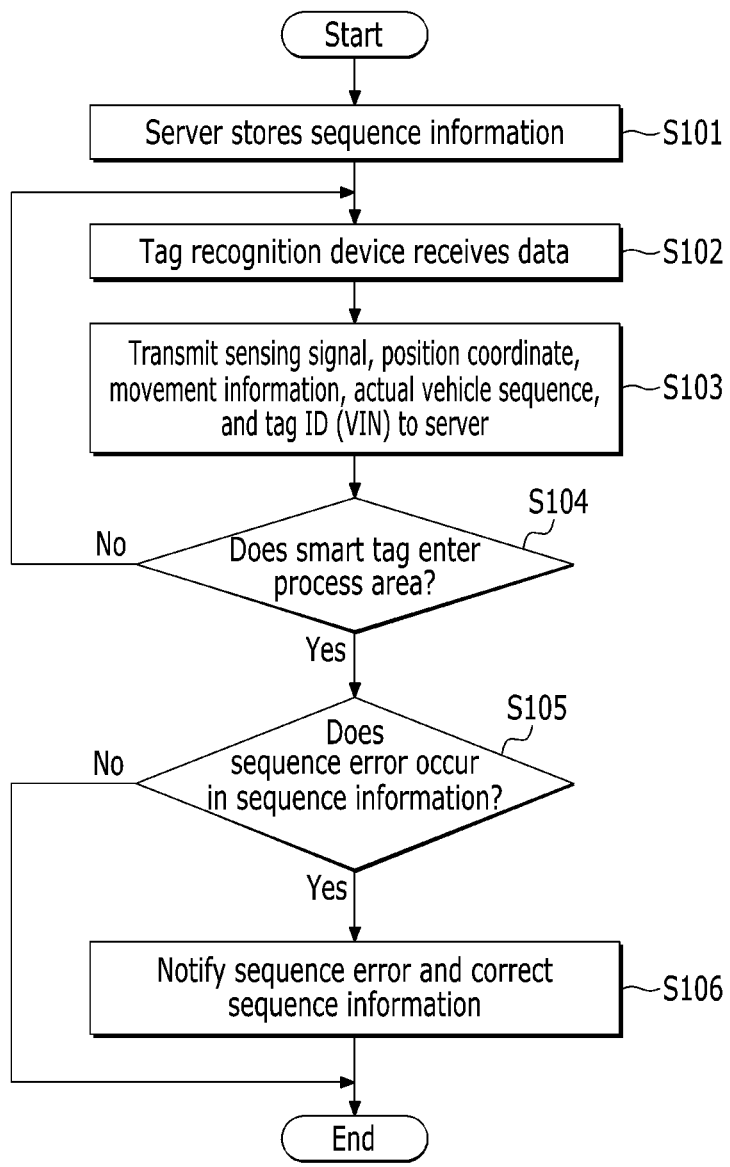
FIG. 5 is a flowchart schematically illustrating a method for sequence management of vehicles according to an exemplary embodiment of the present disclosure.

FIG. 5 is a flowchart schematically illustrating a method for sequence management of a vehicle according to an exemplary embodiment of the present disclosure.

Referring to FIG. 5, the server 30 receives the sequence information of the vehicles, which are sequentially loaded to the movement means of the conveyor from the MES, and stores the received sequence information in the database DB (S101). The sequence information may include the vehicle information (VIN), the specification information, and the tag ID of the vehicles.

The tag recognition device 20 receives the data from the smart tag 10 (S102). The data includes the positional information, the movement information, and the tag ID (VIN).

Thereafter, the tag recognition device 20 transmits the sensing signal, the position coordinate, the movement information, the actual vehicle sequence, and the tag ID (VIN) to the server 30 (S103). That is, the tag recognition device 20 forms the sensing signal, the position coordinate, and the actual vehicle sequence based on the received data and transmits the formed sensing signal, position coordinate, and actual vehicle sequence to the server 30. Further, the tag recognition device 20 may form the entry signal based on the data and transmit the formed entry signal to the server 30. The formation of the entry signal by the tag recognition device 20 may be achieved separately from a step in which the server 30 checks whether the smart tag 10 enters the process area.

Further, the formation of the position coordinate by the tag recognition device 20 may be achieved separately from determination of the position coordinate of the smart tag 10 of the server 30.

Thereafter, the server 30 checks whether the smart tag 10 enters the process area based on the information received from the tag recognition device 20 (S104).

The server 30 recognizes that the tag recognition device 20 receives the data from the smart tag 10 through reception of the sensing signal. Thereafter, the server 30 determines whether the smart tag 10 enters the process area based on the position coordinate received from the smart tag 20.

That is, the server 30 compares the position coordinate of the smart tag 10 with the map of the production line and when the position coordinate is within the process area indicated on the production line map, the server 30 regards that the smart tag 10 enters the process area.

Further, even though the server 30 does not receive the position coordinate from the tag recognition device 20, the position tracking device 33 of the server 30 derives the position coordinate of the smart tag 10 to confirm the entry in the process area.

When the position coordinate does not exist in the process area, it is determined that the smart tag 10 does not enter the process area and the process returns to step S102 in which the tag recognition device 20 collects the data.

When it is confirmed that the smart tag 10 enters the process area, the server 30 determines whether the sequence error occurs in the sequence information (S105). The server 30 checks whether the actual sequence information received from the tag recognition device 20 is consistent with the sequence information stored in the DB to determine whether the sequence error occurs in the sequence information. That is, the server 30 compares the tag ID (VIN) received from the tag recognition device 20 and the vehicle information (VIN) stored in the DB to check whether the actual vehicle sequence is consistent with the sequence information stored in the DB. The server 30 determines that the sequence error does not occur when the actual vehicle sequence and the stored sequence information are consistent. When the server 30 determines that the sequence error does not occur in the sequence information, the server 30 terminates the control.

The server 30 determines that the sequence error occurs in the sequence information when the actual vehicle sequence and the stored sequence information are inconsistent.

When the sequence error occurs in the sequence information, the server 30 notifies to the user that the sequence error occurs in the sequence information and corrects the sequence error (S106).

When the sequence error occurs in the sequence information, the server 30 extracts vehicle information (VIN) which is inconsistent with the actual vehicle sequence among the sequence information stored in the DB. The server 30 notifies that the error occurs in the sequence information by a scheme that displays the vehicle information (VIN) which is inconsistent on the screen. Thereafter, the server 30 corrects the sequence information in which the error occurs by changing the vehicle information (VIN) which is inconsistent according to the actual vehicle sequence. In this case, the server 30 includes a step of querying whether the inconsistent vehicle information (VIN) is automatically corrected (Y/N) to the user.

When the user agrees to the automatic correction, the sequence information in which the sequence error occurs may be automatically corrected, and the corrected result may be displayed on the screen.

For example, as illustrated in FIG. 2, the server 30 may display the order of the movement means in which the blank pitch is generated as the blank.

In this case, the server 30 tracks the position of the smart tag 10 removed from the production line at the blank pitch to monitor the processing status and the re-entry of the production line.

Further, when the vehicle is rearranged in a movement means which is in a blank state, the server 30 may correct the sequence information to the tag ID (VIN) of the tag 10 attached to the vehicle rearranged in the blank.

Thereafter, the server 30 transmits the changed sequence information of the vehicle to the MES and another server and shares monitoring information to make the changed sequence information and sequence information managed in an entire production line be consistent.

Meanwhile, the server 30 determines the entry in the process area according to the tag ID (VIN) received by the tag recognition device 20 and calculation of the position coordinate in step S104 of FIG. 5.

In this case, a method for measuring the position coordinate of the smart tag 10 by the tag recognition device 20 will be described with reference to FIG. 6 below.

Figure 6:
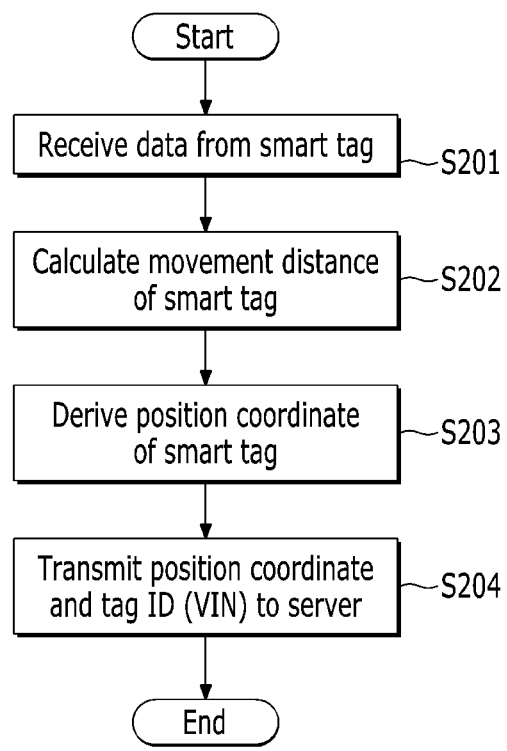
FIG. 6 is a flowchart illustrating a method for measuring a position coordinate of a smart tag according to an exemplary embodiment of the present disclosure.

FIG. 6 is a flowchart illustrating a method for measuring a position coordinates of a smart tag according to an exemplary embodiment of the present disclosure.

Referring to FIG. 6, the tag recognition device 20 receives the data from the smart tag 10 (S201). The data includes the movement information and the positional information of the tag ID (VIN) of the smart tag 10. The movement information includes at least one of the moving speed, the acceleration, the moving time, and the angular velocity of the smart tag 10.

The tag recognition device 20 calculates a movement distance of the smart tag 10 based on a starting point (i.e., origin) of the production line based on the movement information (S202).

For example, when the vehicle moves from the starting point, the tag recognition device 20 measures the acceleration according to time, integrates the measured acceleration with time, calculates the speed, and integrates the speed with time to calculate the movement distance of the smart tag 10 based on the starting point.

The tag recognition device 20 derives the position coordinate of the smart tag 10 by matching the movement distance of the smart tag 10 calculated above with the map information of the production line (S203). When the movement distance of the smart tag 10 corresponds to a length of the production line route, the position coordinate may be derived.

The tag recognition device 20 transmits the position coordinate and the tag ID (VIN) of the smart tag 10 corresponding to the position coordinate to the server 30 (S204).

Meanwhile, in the method for managing the sequence information of the vehicle according to an exemplary embodiment of the present disclosure, since the sequence information is managed based on the position coordinate monitoring of the smart tag 10 attached to the vehicle, it is premised that the smart tag 10 is normally operated while the smart tag 10 is normally attached to the vehicle.

However, an abnormal situation may occur, such as abnormal attachment of the smart tag 10 or separation of the vehicle to which the smart tag 10 is attached from the conveyor. The abnormal situation may include the drop event, a separation event, and a failure/loss event depending on a method for determining the abnormal situation by the server 30. Determination of the drop event, the separation event, and the failure/loss event will be described below with reference to FIG. 7.

When the drop event, the separation event, or the failure/loss event occur, the vehicle and the smart tag 10 storing information of the vehicle are not consistent or the sequence error may be caused. In this case, a method for detecting the abnormal status by the server 30 and a method for monitoring and managing the attachment state and an operation state of the smart tag 10 by the server 30 will be described below with reference to FIGS. 7 and 8.

Figure 7:
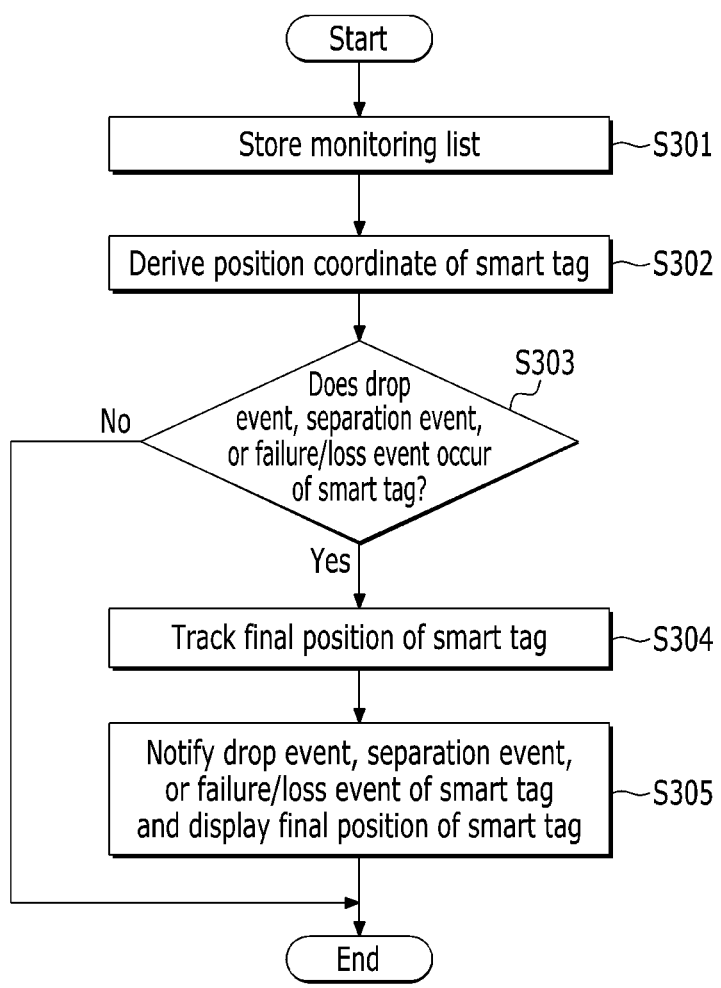
FIG. 7 is a flowchart illustrating a monitoring method for checking of a smart tag according to an exemplary embodiment of the present disclosure.
Figure 8:
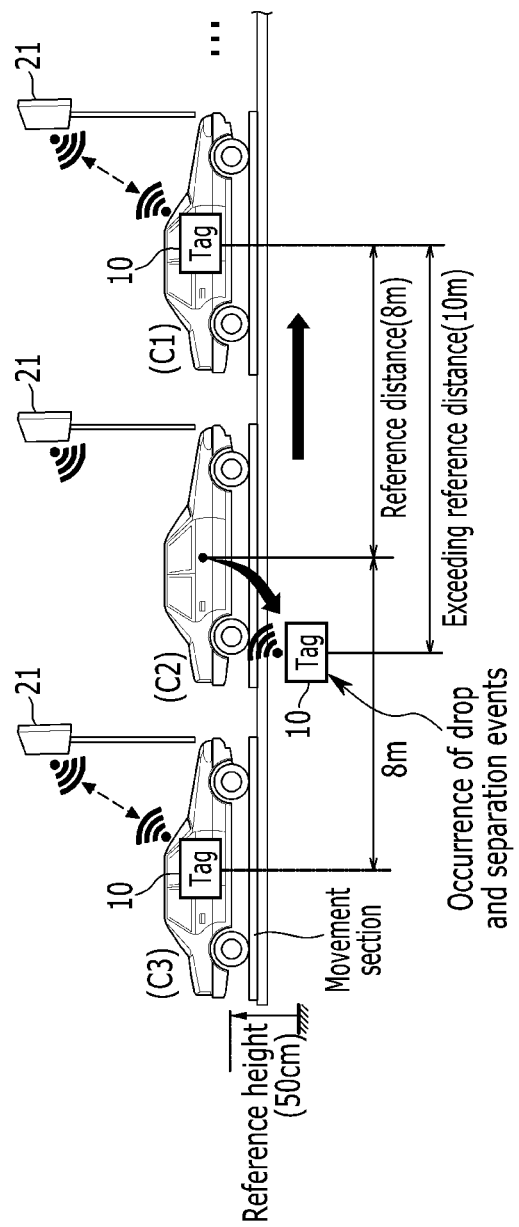
FIG. 8 illustrates a drop/separation event state of a smart tag according to an exemplary embodiment of the present disclosure.

FIG. 7 is a flowchart illustrating a monitoring method for checking of a smart tag according to an exemplary embodiment of the present disclosure and FIG. 8 illustrates a drop/separation event state of a smart tag according to an exemplary embodiment of the present disclosure.

Referring to FIGS. 7 and 8, the server 30 according to an exemplary embodiment of the present disclosure stores a tag ID (VIN) monitoring list according to the sequence information of the vehicle to which the smart tag 10 is attached (S301).

The monitoring list refers to a tag ID (VIN) list of the smart tag 10 attached to the vehicle. Through the monitoring list, the server 30 may determine whether the drop event, the separation event, or the failure/loss event occurs in the smart tag 10.

The server 30 derives the position coordinate of the smart tag 10 (S302).

The server 30 derives the position coordinate of the smart tag 10 by a method for receiving the position coordinate of the smart tag 10 from the tag recognition device 20 or measuring the position coordinate of the smart tag 10 through the position tracking device 33.

The server 30 may monitor the attachment state of the smart tag 10 attached to each of the vehicles that are sequentially moved on the production line based on the position coordinate and the movement information received from the smart tag 10.

The server 30 determines whether the drop event, the separation event, or the failure/loss event occurs in the smart tag 10 by using the movement information and the position coordinate (S303). When the server 30 detects that the position of the smart tag 10 is less than a predetermined reference height from the ground based on the movement information received from the tag recognition device 20, the server 30 may determine that the drop event of the smart tag 10 occurs.

The predetermined reference height may be, for example, 50 cm, but is not limited thereto.

In addition, the server 30 may determine that the drop event occurs when the smart tag 10 is dropped at the gravitational acceleration. When a distance between the smart tag 10 and the smart tag 10 attached to the vehicle on a front side is greater than or equal to a predetermined distance by using the position coordinate of the smart tag 10, the server 30 may determine that the separation event occurs, in which the vehicle is separated out of the conveyor. The predetermined distance is an arbitrary value selected by those skilled in the art.

When the server 30 measures the distance between the smart tags 10, the distance is measured based on the position coordinate of the smart tag 10 received from the tag recognition device 20.

The server 30 may determine the failure/loss event of the smart tag 10 based on a receiving interval of the position coordinate of the smart tag 10.

That is, the server 30 determines that the failure/loss event occurs in the smart tag 10 when an interval of receiving the position coordinate of the smart tag 10 from the tag recognition device 20 exceeds a set reference time. The receiving interval is an arbitrary value selected by those skilled in the art.

Further, the server 30 may use the tag ID (VIN) of the smart tag 10 when determining the drop event, the separation event, and the failure/loss event of the smart tag 10 and tracking a final position.

In addition, unlike determining, by the server 30, whether the drop event, the separation event, or the failure/loss event occurs, the smart tag 10 may autonomously diagnose whether the drop event, the separation event, or the failure/loss event occurs and transmit the occurrence of the drop event, the separation event, and the failure/loss event to the server 30.

The server 30 terminates the control when the drop event, the separation event, or the failure/loss event does not occur in the smart tag 10.

When the drop event, the separation event, or the failure/loss event does not occur in the smart tag 10, the server 30 tracks the final position of the smart tag 10 in which the drop event, the separation event, or the failure/loss event occurs in the monitoring list (S304).

In this case, the server 30 may track the final position of the smart tag by a method for tracking the final position at which the tag ID (VIN) of the smart tag 10 is last stored.

Thereafter, the server 30 may notify the drop event, the separation event, or the failure/loss event of the smart tag 10 and display the final position of the smart tag 10 on the screen (S305).

In the above description, conditions of the reference height, the reference distance, and the reference time set for the determination of each event may be changed according to a facility of the production line and the operation state of the production line.

As such, according to an exemplary embodiment of the present disclosure, the server 30 determines that the order of movement of the actual vehicle on the production line is changed, and the server 30 automatically changes the sequence information so as to prevent the sequence information error due to a mis-input or omission.

Further, the sequence information error of the vehicle is prevented to reduce a defective product due to mis-mounting or non-mounting of the part in the production line and prevent line stop, thereby enhancing a yield.

In addition, the attachment state and the operation state of the smart tag are monitored through a self-diagnosis to enhance reliability of sequence information management of a smart tag based vehicle.

While the exemplary embodiments of the present disclosure have been described hereinabove, the present disclosure is not limited to only the exemplary embodiments and various other changes can be made.

For example, in the exemplary embodiment of the present disclosure illustrated in FIG. 6, it is described that the tag recognition device 20 calculates the movement distance of the smart tag 10 from the starting point of the production line and measures the position coordinate on the conveyor route.

However, the exemplary embodiment of the present disclosure is not limited thereto and the smart tag 10 may calculate the movement distance of the smart tag 10 from the starting point of the production line and measure the position coordinate on the conveyor route and provide the measured position coordinate to the server 30 through the tag recognition device 20.

The exemplary embodiments of the present disclosure are not limited to the above-described apparatus and/or method, but may be implemented through a program for implementing functions corresponding to the configuration of the exemplary embodiment of the present disclosure, a recording medium on which the program is recorded, and the like and the present disclosure can be easily implemented by those skilled in the art from the description of the exemplary embodiments described above. For example, the various embodiments disclosed herein can be implemented using one or more processors coupled to a memory (or other non-transitory machine readable recording medium) storing computer-executable instructions for causing the processor(s) to perform the functions described above including the functions described in relation to the sever 30, tag recognition device 20, and the tag 10.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system for sequence management of vehicles, the system comprising:
   smart tag respectively attached to vehicles which are sequentially moved in a production line;
   a tag recognition device, disposed in the production line, receiving data from the smart tags and sensing whether the smart tags enter respective process areas and an actual vehicle sequence through the data; and
   a server storing sequence information of the vehicles, receiving the actual vehicle sequence from the tag recognition device, comparing the sequence information and the actual vehicle sequence, determining whether a sequence error occurs in the sequence information, and when the error occurs in the sequence information, changing the sequence information to the actual vehicle sequence,
   wherein:
   the tag recognition device further includes a reader antenna receiving the data from the smart tags, and
   the tag recognition device calculates movement distances of the smart tags based on a starting point of the production line and derives position coordinates of the smart tags by comparing the movement distances with map information of the production line.

2. The system of claim 1, wherein:
   the sequence information includes vehicle information (VIN) of each vehicle to which a respective one of the smart tags is attached, specification information, and a tag ID.

3. The system of claim 1, wherein:
   the data transmitted by the smart tag includes a tag ID (VIN), movement information, and positional information, and the tag ID (VIN) of the smart tag is configured by the vehicle information (VIN) of the vehicle.

4. The system of claim 3, wherein:
   each smart tag includes
   a radio frequency identification (RFID) transmitting the data to the tag recognition device,
   a memory storing the tag ID (VIN),
   a battery supplying power for operating the smart tag,
   an acceleration sensor measuring an acceleration and a moving speed of the smart tag,
   a gyro sensor measuring an angular velocity of the smart tag and a moving direction of the smart tag depending on the angular velocity, and
   a control module transmitting the movement information to the tag recognition device, and
   the movement information includes at least one of the moving speed, the acceleration, a moving time, and the moving direction of the smart tag.

5. A system for sequence management of vehicles, the system comprising:
   smart tag respectively attached to vehicles which are sequentially moved in a production line;
   a tag recognition device, disposed in the production line, receiving data from the smart tags and sensing whether the smart tags enter respective process areas and an actual vehicle sequence through the data; and
   a server storing sequence information of the vehicles, receiving the actual vehicle sequence from the tag recognition device, comparing the sequence information and the actual vehicle sequence, determining whether a sequence error occurs in the sequence information, and when the error occurs in the sequence information, changing the sequence information to the actual vehicle sequence,
   wherein:
   the server further receives position coordinates and sensing signals from the tag recognition device, and
   the server includes
   a database DB storing the sequence information,
   a communication device receiving tag IDs (VIN), the position coordinates, and the sensing signals of the smart tags from the tag recognition device,
   a sequence management device receiving the sequence information from a manufacturing execution system (MES),
   a position tracking device tracking the position coordinates of the smart tags, and
   a controller checking whether the smart tags are within the respective process areas by comparing the position coordinates of the smart tags with a map of the production line when the communication device receives the sensing signals.

6. The system of claim 5, wherein:
   the controller causes a screen to display vehicle information (VIN) which is inconsistent with the actual vehicle sequence in the sequence information and to display sequence error information when the sequence error occurs in the sequence information.

7. The system of claim 5, wherein:
the controller causes a screen to display as a blank an order of a conveyor moving section in which a blank pitch is generated in the sequence information.

8. The system of claim 7, wherein: when a vehicle re-enters a movement section which is in a blank state, the controller changes the sequence information to the tag ID (VIN) of the smart tag attached to the vehicle which re-enters in the blank.

9. A method for managing a sequence of vehicles by using a server installed in a production line, smart tags respectively attached to the vehicles, and a tag recognition device, the method comprising:
storing, by the server, sequence information (VIN) of the vehicles sequentially arranged in the production line;
receiving, by the tag recognition device, data from the smart tags, calculating position coordinates of the smart tags through the data, and sensing an actual vehicle sequence and transmitting the sensed vehicle sequence to the server;
receiving, by the server, the position coordinates and the actual vehicle sequence from the tag recognition device and determining whether the smart tags enters respective process areas through the position coordinates;
determining, by the server, whether a sequence error occurs in the sequence information when it is determined that the smart tags enter the respective process area; and
changing, by the server, the sequence information to the actual vehicle sequence when it is determined that the sequence error occurs.

10. The method of claim 9, further comprising:
before the receiving of the sequence information by the server, correcting, by the smart tags, tag IDs to vehicle information (VIN) of the vehicles to which the smart tags are attached, respectively.

11. The method of claim 9, wherein:
the determining of whether the smart tags enter the respective process areas by the server is made based on whether the position coordinates of the smart tags received from the tag recognition device are within the respective process areas of a map of the production line.

12. The method of claim 9, wherein:
in the calculating of the position coordinates by the tag recognition device, movement distances of the smart tags are calculated based on a starting point of the production line and the movement distances of the smart tags are compared with map information of the production line and derived based on the comparison.

13. The method of claim 9, wherein:
the determining of whether the sequence error occurs by the server includes extracting vehicle information (VIN) which is inconsistent with the actual vehicle sequence in the stored sequence information when the sequence error occurs, and displaying, on a screen, the inconsistent vehicle information (VIN) and the sequence error.

14. The method of claim 9, wherein:
the changing of the sequence information by the server includes
changing an order of a movement section in which a blank pitch is generated in the sequence information to a blank, and
changing, when the vehicle is rearranged to the movement section changed to the blank, the blank to a tag ID (VIN) of the smart tag attached to the rearranged vehicle.

15. The method of claim 9, wherein:
the server further includes a position tracking device,
the determining of whether the smart tags enter the respective process areas by the server includes measuring, by the position tracking device, the position coordinates of the smart tags and determining that a drop event occurs in one of the smart tags when the one of the smart tags is less than a predetermined reference height, and
the measuring, by the position tracking device, the position coordinates of the smart tags is based on a real-time locating system (RTLS).

16. The method of claim 9, wherein:
the determining of whether the smart tags enter the respective process areas by the server includes determining that a drop event of one of the smart tags occurs when the one of the smart tags is dropped at a gravitational acceleration.

17. The method of claim 9, wherein:
the determining of whether the smart tags enter the respective process areas by the server includes determining, by the server, that a separation event occurs when a distance between a front vehicle and a rear vehicle exceeds a set reference distance.

18. The method of claim 9, wherein:
the determining of whether the smart tag enters the respective process areas by the server includes determining that a failure or loss event of one of the smart tags occurs when a receiving time interval of the position coordinate of the one of the smart tags, which is received from the tag recognition device exceeds a set reference time.

* * * * *